United States Patent [19]
Bürge et al.

[11] Patent Number: 5,919,300
[45] Date of Patent: *Jul. 6, 1999

[54] DISPERSING AGENT FOR HIGH-FLOW OR SELF-COMPACTING CONCRETE

[75] Inventors: Theodor A. Bürge, Geroldswil; Ueli Sulser, Oberengstringen; Jürg Widmer, Zürich; Anna Krapf-Huber, Oberengstringen, all of Switzerland

[73] Assignee: Sika AG. vorm. Kaspar Winkler & Co., Zurich, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/958,325

[22] Filed: Oct. 27, 1997

[30] Foreign Application Priority Data

Oct. 27, 1996 [EP] European Pat. Off. ............. 96117234

[51] Int. Cl.$^6$ .................................................. C04B 24/12
[52] U.S. Cl. ...................... 106/727; 106/808; 106/823; 524/5; 524/548; 524/555; 524/558; 524/559
[58] Field of Search ...................... 106/696, 727, 106/802, 808, 823; 524/5, 555, 548, 558, 559

[56] References Cited

U.S. PATENT DOCUMENTS

| | | |
|---|---|---|
| 4,434,257 | 2/1984 | Narisawa et al. ........................ 524/5 |
| 4,471,100 | 9/1984 | Tsubakimoto et al. . |
| 5,100,984 | 3/1992 | Burge et al. . |
| 5,339,903 | 8/1994 | Eoff et al. ............................. 166/293 |
| 5,369,198 | 11/1994 | Albrecht et al. . |
| 5,679,738 | 10/1997 | Bafford et al. ......................... 524/555 |

FOREIGN PATENT DOCUMENTS

| | | |
|---|---|---|
| 59-0162157 | 9/1984 | Japan . |
| 61-1158851 | 7/1986 | Japan . |

*Primary Examiner*—Paul Marcantoni
*Attorney, Agent, or Firm*—Burns, Doane, Swecker & Mathis, L.L.P.

[57] ABSTRACT

Cement dispersing agents for self-compacting concrete of high flowability, comprising a water-soluble N-vinyl copolymer, prepared by copolymerizing (a) an N-vinyl-lactame or -amide with (b) a polyethylene glycol ester of maleic acid containing 6 to 240 moles of oxyethylene groups per molecule and (c) at least one monomer selected from among unsaturated dicarboxylic acids and (d) methallylsulfonic acid. When an aqueous solution of this copolymer is used as an admixture to freshly prepared concrete of even extremely low water-to-cement ratio, a high fluidity, a low decrease in flowability with the progression of time and a lack of segregation over time is attained.

12 Claims, No Drawings

DISPERSING AGENT FOR HIGH-FLOW OR SELF-COMPACTING CONCRETE

CROSS-REFERENCE TO RELATED APPLICATIONS

This application claims the priority of the European application No. 96 117 234.3, filed on Oct. 27, 1996, the disclosure of which is incorporated herein by reference.

BACKGROUND OF THE INVENTION

The invention relates to cement dispersing agents for self-compacting concrete of high flowability. When an aqueous solution of the inventive dispersing agent is used as an admixture to freshly prepared concrete of extremely low water-to-cement ratio, a high fluidity, a low decrease in flowability with the progression of time and an absence of segregation over time is achieved.

Concrete from ready mix plants or mixed on job sites, used in civil engineering constructions, e.g. anchorage of big bridges, base plates or side walls and box culverts, in building structures such as heavy reinforced structures, concrete filling pipe structures or other complicated structures, demands to be fully compacted to achieve its required strength and durability. The existing and conventional method for compacting is by vibration of the freshly placed concrete.

A new production system for in situ-casted concrete is needed to improve significantly the cost situation as well as the health and safety aspects on the construction site.

Additionally, self compacting concrete leads to a higher productivity, shorter building times and to an improved labour environment.

Increased fluidity (known as "slump" and slump-flow) can be realized by using large dosages of water in the concrete, but it is well known that the resulting cement-based structure exhibits insufficient compactness and will have poor final compressive strength.

In order to avoid excess amount of water, flowing concrete can be produced by the addition of so-called super-plasticizers or high range water-reducing admixtures (HRWRs) like sulphonated melamine- or naphthalene-formaldehyde polycondensates or ligninsulphonate based admixtures. All of these well known materials are not capable of causing the treated cement compositions to retain high flowability over a sustained period of time (known as "slump life") without imparting a significant delay in the initial set time and considerable retardation of early strengths.

More recently, various additives based on so called polycarboxylic acid salts, e.g. copolymers of acrylic acid with acrylic esters have been proposed for imparting high water reduction and prolonged slump life to concrete, but most of them do not lead to self-compacting concrete without bleeding, segregation or cause a too long retardation of the setting time and the strength development. An additional disadvantage is the inconstant and very low flow rate of high-flowing—high-strength concrete, containing high quantities (e.g. 500 to 700 kgs/m³) of cement and up to 20% of silica fume and fly ash, which flow rate cannot be improved by the use of conventional HRWRs.

BRIEF SUMMARY OF THE INVENTION

Hence, it was a general object of the present invention to provide dispersing agents which avoid at least partially the above mentioned drawbacks, i.e. to provide a dispersing agent that is suitable for the preparation of concrete having a high fluidity, a low decrease in flowability with the progression of time and which is devoid of a segregation over time, even with an extremely low water-to-cement ratio of said concrete.

Now, in order to implement these and still further objects of the invention, which will become more readily apparent as the description proceeds, the dispersing agent according to the invention is manifested by the features that it comprises a water-soluble N-vinyl copolymer, prepared by copolymerizing, preferably in an aqueous medium, (a) a N-vinyl-lactame or -amide with (b) a polyethylene glycol ester of maleic acid containing 6 to 240 moles of oxyethylene groups per molecule and (c) at least one monomer selected from among unsaturated dicarboxylic acid salts and optionally (d) a methallylsulfonic acid salt.

When an aqueous solution of the copolymer according to the present invention is used as an admixture to freshly prepared concrete of even extremely low water-to-cement ratio, high fluidity, low decrease in flowability with progression of time and lack of segregation over time is attained.

DETAILED DESCRIPTION OF THE INVENTION

The present invention is based on extensive studies of water-soluble N-vinyl-copolymers having a poly (oxyethylene)chain which is connected to the backbone of the polymer via ester bonds. In particular, the relationship between the molar ratio of the N-vinyl monomer to the polyoxyethylene bearing monomer in the polymer as well as the length of the polyoxyethylene chain of the starting monomer and the performance of the copolymer as a dispersing and waterreducing agent was investigated.

The problem that could be solved by the present invention is that prior cement dispersing agents, e.g. conventional HRWRs as discussed above, when used as an additive to produce high-flowing, high-strength concrete, cannot provide high flowability and flow speed constancy and that the slump loss is too large.

This invention relates therefore to cement dispersion additives comprising water-soluble N-vinyl copolymers preferably obtained by aqueous solution radical copolymerization of a N-vinylamide or -lactame shown by formula 1 given below, a second monomer shown by formula 2 given below, a third monomer shown by formula 3 given below, and optionally low amounts of a fourth monomer, represented by formula 4 given below, such that the molar ratio of constituent monomer units 1:2:3:4 is 1:(0.1–0.95): (0.05–0.90):(0–0.10) as converted to monomers of the following structural formulas:

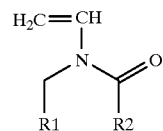

formula 1 wherein R1 and R2, which may be the same or different, each represent hydrogen, a $C_1$ to $C_{12}$-alkyl residue or may together form a di-, tri-, tetra-, or pentamethylene group, which form with the residue of the formula a five-, six-, seven- or eigth-membered lactame ring,

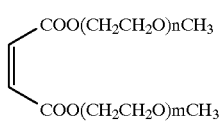

formula 2 wherein m and n, which may be the same or different, each represent an integer in the range of 3 to 150, preferably in the range of 3 to 120,

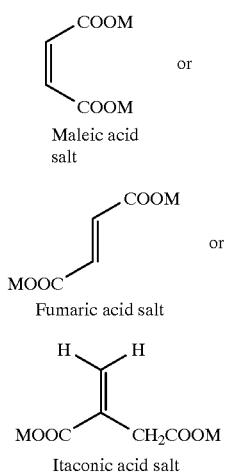

formula 3 wherein M is hydrogen or an alkali- or alkaline earth metal, ammonium or ammonium derived from primary, secondary or tertiary amines, preferably from ethanolamines,

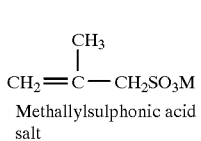

formula 4 wherein M is an alkali metal, earth metal, ammonium or ammonium derived from primary, secondary or tertiary amines, preferably from ethanolamines.

When the fourth monomer of formula 4 is included in the cement dispersion additive, the molar ratio of constituent monomer units 1:2:3:4 is preferably 1:(0.1–0.95):(0.05–0.90):(0.01–0.1). More preferably, the copolymerization ratio of monomers 1:2:3:4 is 1:(0.2–0.6):(0.4–0.8):(0.01–0.05).

The monomer 2 is prepared by acid-catalyzed reaction of maleic anhydride with a total of 2 moles of one or more monomethoxy-polyethylene glycols, characterized by the number of oxyethylene groups ($CH_2CH_2O$) which form the polyalkyleneglycol-chain. Preferred embodiments of monomers of type 2 are the monomers M-1 to M-7 as shown in Table 1. Additional preferred embodiments of monomers of type 2 are the reaction product of maleic anhydride and a polyethylene-monoethyl ether with a molar number of additive ethylene oxide of from 7 to 115.

Concerning the monomer 3 it is important that at least one of the carboxylic acid groups is in conjugation with the vinylic system.

The copolymers of the present invention can be prepared by the copolymerization of a N-vinyl lactame or -amide, preferably N-vinyl pyrrolidinone, a methoxypolyethyleneglycol ester of maleic acid and an olefinic dicarboxylic acid, preferably maleic or itaconic acid, in the presence of a peroxide catalyst in aqueous solution. Preferably the sodium salt of maleic acid or itaconic acid is used.

The number-average molecular weight of the water-soluble N-vinyl copolymer is preferably in the range of 3000 to 35,000.

The molar ratio of N-vinyl pyrrolidinone to the polyethyleneglycol ester in the inventive copolymers is typically 50:(5–47.5), preferably 50:(10–30) and of N-vinylpyrrolidinone to the dicarboxylic acid monomer 50:(2.5–45), preferably 50:(10–40). Each of the copolymers may contain small amounts of sodium-methallylsulphonate in the range of 0.05 to 5 mol % referred to the total of all monomers 1 to 3.

As noted above the inventive copolymers are useful as dispersing agents in admixtures for cement containing compositions. They may be used also as dispersing agents in aqueous suspensions of, for example, clays, porcelain muds, chalk, talcum, carbon black, stone powders, pigments, silicates and hydraulic binders.

Also, the copolymers of the invention are useful as fluidizers or superfluidizers for water containing building- and construction materials, containing inorganic binders such as Portland cement, alumina earth cement, blast furnace cement, puzzolane cement or magnesia cement and additives such as sand, gravel, stone powder, fly ash, silica fume, vermiculite, expanded glass, expanded clays, chamotte, light weight additives, inorganic fibers and synthetic fibers.

Optionally, the admixture can also contain components selected from the groups of tensides, air entraining agents, antifoaming agents, set accelerating agents, set retarders and concrete waterreducers or high range waterreducers.

In this context, the inventive polymers can provide such high and surprisingly long lasting effects on flowability of cement-based compositions, that they may be used effectively in low concentrations, thereby avoiding retardation effects on setting.

The concrete composition containing present inventive copolymers show high flowability and high resistance to segregation, additionally the slump retention with progression of time, even at low water to cement-ratio, is extremely prolonged.

In particular, high fluidity is provided to cement containing compositions with extremely low water-to-cement ratio with a content of cement in the range of 300 to 450 kg/m$^3$ for flowing concrete and in the range of 450 to 700 kg/m with a water-to-cement weight ratio of greater than 18% and less than 35% or more preferably, greater than 18% and less than 25%, for self- compacting-high strength concrete.

In a preferred embodiment, a mortar or concrete is provided which comprises a unit content of a binder and the inventive dispersing agent in an amount of 0.01% to 10% by weight of the binder. The binder is composed of cement or a mixture of cement and latent hydraulic or inert microscopic powder of 150 to 800 kg/m$^3$, preferably 450 to 750 kg/m$^3$. The mortar or concrete has a water-to-binder ratio in the range of 0.15 to 0.50, preferably 0.18 to 0.35. The cement preferably is Portland cement, white cement or high alumina cement, and the latent hydraulic or inert microscopic powder is preferably fly ash, slag, silica fume, burnt oil shale, metakaolin or calcium carbonate.

The amount of added inventive copolymer, required to provide the desired effects is from 0.05 to 5 parts by weight, preferably from 0.1 to 3 parts by weight as converted to solid compound based on 100 parts by weight of the hydraulic cement material contained in the concrete composition.

In a preferred embodiment, the inventive N-vinyl copolymers are used in the form of an aqueous solution. In this embodiment the aqueous solution contains the inventive copolymer in an amount ranging from 0.01 to 60% by weight, preferably from 1 to 50% by weight.

The inventive copolymers may also be added in any other conventional manner without or together with other additives. For example they can be added to the mixing water used for the production of the concrete or to an already mixed concrete batch.

The following examples illustrate in more detail the present invention and describe the use and the performance of inventive copolymers more clearly.

Copolymers P-1 to P-14

General Procedure of Preparation:

An aqueous solution was prepared, containing one or more of the maleic polyethyleneglycol-ester monomers, an unsaturated dicarboxylic acid such as maleic- or itaconic acid, sodium methallyl sulphonate and a peroxide initiator such as aqueous 35%-hydrogenperoxide. Then, to this solution was dropped the N-vinyl pyrrolidinone, followed by the quick addition of a second solution containing a redox radical initiator. The polymerization was carried out at slightly elevated temperatures of 20–60° C. and at a pH-range of 4.5–7.0. Stirring was continued until no peroxide was detectable any longer.

The polymers were obtained as 30–40%-aqueous solutions.

Number-average molecular weights were determined by gelpermeation chromatography using an RI-detector (refraction index) or a light scattering detector.

TABLE 1

Reaction products of maleic anhydride and various monomethoxy-polyethyleneglycols, used as monomers in the preparation of inventive copolymers

| Monomer-Designation | Maleic anhydride (moles) | $CH_3O(CH_2CH_2O)_3H$ (moles) | $CH_3O(CH_2CH_2O)_{12}H$ (moles) | $CH_3O(CH_2CH_2O)_{22}H$ (moles) | $CH_3O(CH_2CH_2O)_{45}H$ (moles) | $H_3O(CH_2CH_2O)_{113}H$ (moles) |
|---|---|---|---|---|---|---|
| M-1 | 1 | 2 | | | | |
| M-2 | 1 | | 2 | | | |
| M-3 | 1 | | | 2 | | |
| M-4 | 1 | | | | 2 | |
| M-5 | 1 | | | | | 2 |
| M-6 | 1.50 | | 2 | | 1 | |
| M-7 | 1.50 | | 1 | | 1 | 1 |

However, it must be noted that these examples are given for illustrative purposes only and are not supposed to limit the invention, as defined by the claims, appended hereto.

Examples

In the following, the composition of maleic polyglycolester-monomers M-1 to M-7 (table 1) and some inventive copolymers P-1 to P-14 based thereon (table 2) are described. For comparison, commercially available polymers, C-1 to C-3, are also used for the preparation and comparative testing of flowing concrete (testexample 1) and high-strenght, self compacting concrete of low water-to-cement ratio (testexample 2).

General Method of Preparation Monomers M-1 to M-7 (acc. to table 1)

A mixture, containing maleic anhydride, the polyethylene glycols and an acidic catalyst, such as sulphuric acid or p-toluenesulphonic acid was heated to 140° C. The clear reaction mixture was kept at 140–145° C. until a degree of esterification of at least 80% was attained. The progress of esterification can be controlled by alkalimetric titration of small samples of the mixture using a NaOH- or KOH-standard solution. The reaction water was removed continuously by the distillation. The resulting polyethyleneglycol-maleate was analyzed by HPLC, using UV-absorption detection.

TABLE 2

Types of Monomers and their ratio of copolymerization in molar %

| Designation of Copolymer | N-vinyl-pyrrolidone | M-1 | M-2 | M-3 | M-4 | M-5 | M-6 | M-7 | Maleic acid | Itaconic acid | Na-methallyl-sulphonate | Number average Molecular-weight |
|---|---|---|---|---|---|---|---|---|---|---|---|---|
| P-1 | 50.00 | 25.00 | | | | | | | 25.00 | | | 14000 ± 2000 |
| P-2 | 50.00 | 24.10 | | | | | | | 24.10 | | 1.80 | 7500 ± 1000 |

TABLE 2-continued

Types of Monomers and their ratio of copolymerization in molar %

| Designation of Copolymer | N-vinyl-pyrroli-done | M-1 | M-2 | M-3 | M-4 | M-5 | M-6 | M-7 | Maleic acid | Itaconic acid | Na-methallyl-sulphonate | Number average Molecular-weight |
|---|---|---|---|---|---|---|---|---|---|---|---|---|
| P-3  | 50.00 | 25.00 |       |       |       |       |       |       | 25.00 |       |      | 18000 ± 2000 |
| P-4  | 50.00 | 24.10 |       |       |       |       |       |       | 24.10 |       | 1.80 | 9000 ± 1000 |
| P-5  | 50.00 |       | 24.10 |       |       |       |       |       | 24.10 |       | 1.80 | 8000 ± 1000 |
| P-6  | 50.00 |       |       | 24.10 |       |       |       |       | 24.10 |       | 1.80 | 11000 ± 2000 |
| P-7  | 50.00 |       |       | 24.10 |       |       |       |       |       | 24.10 | 1.80 | 10500 ± 2000 |
| P-8  | 50.00 |       |       |       | 24.10 |       |       |       | 24.10 |       |      | 21000 ± 3000 |
| P-9  | 50.00 |       |       |       |       | 24.10 |       |       | 24.10 |       | 1.80 | 8500 ± 1000 |
| P-10 | 50.00 |       |       |       |       | 24.10 |       |       |       | 24.10 | 1.80 | 7000 ± 1000 |
| P-11 | 50.00 |       |       |       |       | 16.26 |       |       | 32.52 |       | 1.22 | 11000 ± 2000 |
| P-12 | 50.00 |       |       |       |       | 16.26 |       |       |       | 32.52 | 1.22 | 19000 ± 2000 |
| P-13 | 50.00 |       |       |       |       | 10.00 |       |       |       | 38.50 | 1.50 | 23000 ± 3000 |
| P-14 | 50.00 |       |       |       |       |       |       | 10.00 | 36.81 |       | 3.19 | 12000 ± 2000 |

Comparative Polymers C1 to C3

The following polymers have been tested as dispersive admixture in concrete.

Polymer C-1

A commercially available dispersing agent, SOKALAN CP 10, (BASF, Badische Anilin & Sodafabrik Ludwigshafen), a 45% aqueous solution of a modified sodiumpolyacrylate of an average molecular weight of 4000.

Polymer C-2

MELMENT-F10 (Süddeutsche Kalkstickstoffwerke, Trostberg), a commercially available dispersing agent for hydraulic cement masses, is the sodium salt of a sulfonated melamine-formaldehyde polycondensate of a molecular weight of 10000–15000.

Polymer C-3

MIGHTY-150 (KAO Corporation, Tokyo), a commercially available dispersing agent for hydraulic cement masses, is the sodium salt of a sulfonated naphthalene-formaldehyde polycondensate of an average molecular weight of 6000.

TEST-EXAMPLES

These examples were conducted to demonstrate the improved fluidizing effects of the polymers of the invention. The inventive copolymers P-1 to P-14, prepared according to Table 2 were tested as fluidizers in flowing concrete (test-example 1) and as admixtures to improve the flowability and slump life of high-strenght concrete of low water-to-cement ratio and high binder (cement+silica-fume) content.

Those comparative polymers described above were also tested and compared in this context.

Test-Example 1

Flowing Concrete

Use of inventive copolymers and comparative polymers for flowing concrete.

The consistency of freshly prepared concrete i.e. the mobility or viscosity, is the most important characteristic of workability. For measuring the consistency of concrete a "flow table spread" according to DIN 1048, part 1 is used in industry.

Sometimes the "slump test" according to ASTM C143 is additionally used.

For purposes of this experiment the flow table spread was determined by placing concrete in an iron form on a two-part table (70×70 cm). By removing the form, a concrete body having a truncated cone shape is prepared. Then, the table is lifted on one side for 4 cm, and allowed to fall. This procedure is carried out 15 times, and the concrete spreads. The average diameter of the formed cake corresponds to the flow table spread.

For the slump test, three layers of concrete are put into a mold having a shape of a truncated cone and having certain dimensions, and compressed with 25 pushes of an iron bar. At the top, the concrete is stripped off evenly, then, the form is vertically removed. The concrete body will sink in by itself. The slump is measured by determining the vertical difference between the top of the mold and the displaced original center of the top surface of the test sample.

In order to compare the obtained test results and to bring them into a relation with the consistency, the freshly prepared concrete (see DIN 18555, Part 2) may be divided into consistency ranges:

TABLE 3

Consistency Ranges of Freshly Prepared Concrete

| Denotation | Flow Table Spread (cm) | Slump (cm) |
|---|---|---|
| K1 = rigid | < 30 | < 1 |
| K2 = semi-plastic | 30 to 40 | 1 to 9 |
| K3 = plastic | 41 to 50 | 10 to 15 |
| K4 = fluid | > 50 | > 15 |

Fluidizers are used when specific construction applications are necessary. Flowing concrete is used when high inserting rates (e.g., from 50 to 150 m³/hour) are required, or when the form and reinforcement of a construction part do not allow a compression of the concrete by vibration.

Concretes having K2 or K3 consistencies may be prepared from a concrete of K1 consistency by adding fluidizers (also designated as superplasticizers) when increased mechanical strength at an equal remaining workability shall be obtained.

For a freshly prepared concrete, the fluidizing effect is dependent on the dosage of the superplasticizer. Usually, from 0.2 to 1.5% solid matter quantities (in dissolved form), referred to the weight of cement, are added.

To a high degree, the effect is also dependent on the chemical structure and the molecular weight of the polymer, which forms the basis of the fluidizer.

In order to demonstrate the increased effectiveness of the inventive copolymers, the flow behaviour of concrete mixture containing the copolymers P-1 to P-7 was measured in accordance with DIN 18555, Part 1, and in accordance with DIN 1048, Part 1, and ASTM C143. As a comparison, the polymers C-1 to C-3 were also tested.

TABLE 4

Composition of the fresh concrete mixtures

| Components: | Quantity in kg |
|---|---|
| Normal Portland Cement. Type 1 | 7.5 |
| Netstal filler (chalk filler) | 1.5 |
| Rhine sand "Epple" up to 1.2 mm.* | 9.5 |
| Rhine sand "Epple" 1.2 to 4.0 mm.* | 8.0 |
| Rhine sand "Epple" 4.0 to 8.0 mm.* | 4.5 |
| Mine gravel 8 to 16 mm.* | 11.5 |
| Mine gravel 16 to 32 mm.* | 15.0 |
| Total Water, including mixing water and water of the copolymer solution | 3.4 |
| Copolymer (solid) or comparative polymer, used as fluidizer | 0.04, dissolved in the mixing water. |

*washed and dried

Preparation and Handling of the Concrete Specimen

The cement and the aggregates were premixed for 15 seconds in a 50 liter forced circulation mixer for concrete. The mixing water, containing the fluidizer, was added slowly under stirring over 20 seconds. The batch was then mixed in a wet state for an additional 60 seconds. A part of the fresh concrete was then immediately filled into the mold for the determination of the flow table spread and the slump.

Immediately after measuring the flow table spread, test bodies having edges of 12×12 cm were prepared, and the compressive strength was measured after 1, 7, and 28 days in accordance with DIN 1048, Part 1. The determination of initial setting was carried out according to ASTM-C 403.

Additionally, the copolymers of the present invention were compared to the comparative polymers C-1 to C-3.

As mentioned above, the flow table spread and slump was measured immediately after mixing, and re-measured at 60 and 120 minutes after mixing. A mixing up of the concrete for five seconds was carried out before each new measurement.

Concrete test mixtures No 2 to 18 which were prepared under the same conditions, were then subjected to the above-described examination of flow table spread and slump depending on the time.

The results are summarized in Table 6 and show a high water reduction and a surprisingly long lasting constancy of the flow table spread and the slump of up to 120 minutes in test mixtures nos. 4 to 15 containing the copolymers according to the invention. From a comparison of these mixtures with comparative mixtures nos. 17 and 18, containing the melamine- and naphthalene polycondensates, it can be seen, that the comparative mixes show a strong stiffening after 60 minutes. Also, comparative polymer C-1 (sodium polyacrylate) in test mixture no. 16 shows a similar stiffening tendency.

The measurement of flowing properties of fresh mixtures of high flowing, -high strength concrete of very low water-to-cement ratio(W/C) is described in the next test-example.

Test-Example 2

High Flowing-High Strength Concrete

High flowing-high strength concrete of very low water-to-cement ratio and very high content of binder(cement+ silica fume) is increasingly demanded by the building- and construction industry in Japan. Thus, Japanese raw materials are used in this example for the preparation of the concrete, and the test mixtures were evaluated according to Japanese Industrial Standards (JIS).

Preparation of the Concrete Mixtures

In a mixing ratio as shown in table 5, ordinary Portland cement, silica fume, fine aggregates and coarse aggregates (gravel) were sequentially placed inside a forced mixing-type mixer of 50 liters volume. The cement and the aggregates were premixed for 15 seconds, and then the mixing water, containing the fluidizer and 0.02% (related to the weight of fluidizer) of a synthetic air detrainer, was added slowly under stirring over 20 seconds. The batch was then mixed in a wet state for 3 minutes. After mixing, the mixture was transferred to a mixing boat and retempering was conducted at a predetermined number of times every 60 minutes and the slump-flow and slump with the progression of time was measured for up to 120 minutes according to JIS-A 1101. The procedures specified in JIS-A 1123 and JIS-A 6204 were employed to measure air content and time-dependent compressive strengths.

Results of the evaluation of the mixtures, containing inventive and comparative polymers, are shown in table 7.

TABLE 5

Concrete Mix Proportion

| | | Polymer- | UNIT CONTENT (kg/m$^3$) | | | | |
|---|---|---|---|---|---|---|---|
| W/P | S/A | Dosage | W | C | SF | S | G |
| 22% | 39% | 1.6% | 165 | 675 | 75 | 601 | 950 |

Raw materials:

W = Mixing water, including water of the added fluidizer.
C = Cement: Normal Portland Cement Onoda, Type 1
SF = Undensified Silica fume: density: 2.2–2.7, surface: 100.000–250.000 cm$^2$/g
S = Sand: Sagami River Sand
G = Gravel: Miyagase crashed stone
A = Aggregate: Sand + Gravel
P = Cement + Silica fume
Polymer-dosage: dosage (weight %) of solid polymer, contained in the fluidizer, in relation to the cement weight.

TABLE 6

Time-dependent flow behaviour and compressive strengths of flowing concrete of water-to-cement ratio W/C = 0.45 using inventive and comparative polymers as fluidizers

| Test-Mixture No | Polymer designation | Dosage in % | Flow table spread/slump in cm, x minutes after mixing | | | Compressive strength in Newton/mm$^2$ y days after mixing | | | %-Air content after mixing |
|---|---|---|---|---|---|---|---|---|---|
| | | | x = 0 | 60 | 120 | y = 1 | 7 | 28 | |
| 1 | — | — | 29/2 | 28/2 | 28/1 | 23.3 | 45.1 | 50.1 | 2.3 |
| 2 | P-1 | 0.3 | 52/18 | 53/20 | 50/17 | 16.9 | 34.8 | 39.7 | 1.8 |
| 3 | P-2 | 0.3 | 53/19 | 53/20 | 50/18 | 23.4 | 43.3 | 48.5 | 1.5 |
| 4 | P-3 | 0.3 | 55/21 | 56/21 | 53/20 | 24.2 | 39.3 | 46.0 | 2.0 |
| 5 | P-4 | 0.3 | 56/21 | 56/22 | 54/20 | 20.5 | 39.7 | 48.0 | 1.9 |
| 6 | P-5 | 0.3 | 55/20 | 58/21 | 58/21 | 23.4 | 42.8 | 47.2 | 2.0 |
| 7 | P-6 | 0.3 | 58/20 | 60/25 | 57/22 | 24.9 | 39.0 | 47.1 | 1.8 |
| 8 | P-7 | 0.3 | 60/22 | 61/22 | 60/22 | 26.1 | 42.0 | 49.4 | 1.8 |
| 9 | P-8 | 0.3 | 58/20 | 60/21 | 59/21 | 26.3 | 44.5 | 50.2 | 1.7 |
| 10 | P-9 | 0.3 | 59/22 | 60/20 | 60/20 | 22.9 | 43.1 | 48.9 | 2.0 |
| 11 | P-10 | 0.3 | 60/22 | 62/22 | 61/21 | 23.0 | 43.5 | 50.0 | 1.9 |
| 12 | P-11 | 0.3 | 55/19 | 56/18 | 50/16 | 22.7 | 40.3 | 46.3 | 2.4 |
| 13 | P-12 | 0.3 | 57/20 | 56/19 | 56/20 | 23.5 | 42.7 | 51.8 | 2.0 |
| 14 | P-13 | 0.3 | 58/20 | 60/20 | 59/19 | 24.0 | 44.1 | 52.3 | 1.8 |
| 15 | P-14 | 0.3 | 56/18 | 55/19 | 53/18 | 23.1 | 46.3 | 54.7 | 1.8 |
| 16 | C-1 | 0.3 | 50/16 | 45/15 | 40/10 | 18.5 | 33.1 | 52.7 | 2.1 |
| 17 | C-2 | 0.3 | 52/17 | 37/9 | — | 24.5 | 47.9 | 55.0 | 1.7 |
| 18 | C-3 | 0.3 | 55/20 | 46/16 | 39/10 | 19.4 | 36.9 | 51.7 | 2.0 |

TABLE 7

Time-dependent flow behaviour and compressive strengths of flowing concrete of water-to-cement ratio W/C = 0.22, using inventive and comparative polymers as fluidizers

| Test-Mixture No | Polymer designation | Fluidizer dosage in % | Slump-flow/slump in cm, x minutes after mixing | | | Compressive strength in Newton/mm2 y days after mixing | | %-Air content after mixing |
|---|---|---|---|---|---|---|---|---|
| | | | x = 0 | 60 | 120 | y = 7 | 28 | |
| 1 | — | — | <35/1 | — | — | 43.3 | 63.9 | 10.4 |
| 2 | P-1 | 1.6 | 54/17 | 60/22 | 61/22 | 71.6 | 99.9 | 2.1 |
| 3 | P-2 | 1.6 | 50/18 | 52/18 | 60/20 | 69.0 | 102.0 | 2.0 |
| 4 | P-3 | 1.6 | 59/19 | 61/21 | 60/21 | 68.2 | 100.0 | 2.0 |
| 5 | P-4 | 1.6 | 62/22 | 63/22 | 60/20 | 70.8 | 103.4 | 1.9 |
| 6 | P-5 | 1.6 | 61/19 | 61/20 | 62/21 | 71.9 | 105.0 | 1.8 |
| 7 | P-6 | 1.6 | 65/25 | 64/23 | 62/22 | 73.6 | 107.0 | 2.2 |
| 8 | P-7 | 1.6 | 65/22 | 64/22 | 60/19 | 72.0 | 102.5 | 2.5 |
| 9 | P-8 | 1.6 | 61/18 | 62/20 | 60/19 | 75.9 | 106.3 | 2.3 |
| 10 | P-9 | 1.6 | 64/25 | 62/23 | 63/22 | 70.9 | 102.4 | 2.5 |
| 11 | P-10 | 1.6 | 65/26 | 64/25 | 64/24 | 71.1 | 103.0 | 2.8 |
| 12 | P-11 | 1.6 | 58/19 | 56/18 | 51/17 | 71.8 | 104.5 | 2.5 |
| 13 | P-12 | 1.6 | 60/19 | 61/20 | 60/21 | 73.3 | 105.8 | 2.6 |
| 14 | P-13 | 1.6 | 62/21 | 55/18 | 49/16 | 66.3 | 100.2 | 2.7 |
| 15 | C-1 | 1.6 | 55/18 | 51/17 | 45/17 | 61.5 | 89.9 | 2.2 |
| 16 | C-2 | 1.6 | 41/2 | — | — | 75.1 | 109.3 | 1.7 |
| 17 | C-3 | 1.6 | 46/8 | — | — | 68.8 | 99.1 | 2.6 |

While there are shown and described presently preferred embodiments of the invention, it is to be distinctly understood that the invention is not limited thereto but may be otherwise variously embodied and practiced within the scope of the following claims.

We claim:

1. A cement dispersing agent, comprising a watersoluble N-vinyl-copolymer obtainable by copolymerization of a N-vinylamide or vinyl lactame shown by formula 1 given below, a second monomer shown by formula 2 given below, and a third monomer shown by formula 3 given below such that the molar ratio of constituent monomer units 1:2:3 is 1:(0.1–0.95):(0.05–0.90) as converted to monomers of the following structural formulas:

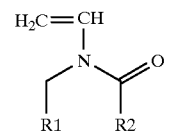

formula 1 wherein R1 and R2, which is the same or different, each represent hydrogen, or a $C_1$ to $C_{12}$-alkyl residue which optionally together form a di-, tri-, tetra-, or pentamethylene group which form with the amido residue of the formula a five-, six-, seven- or eight-membered lactame ring,

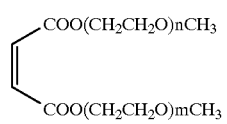

formula 2 where m and n, which is the same or different, each represent an integer in the range of 3 to 150,

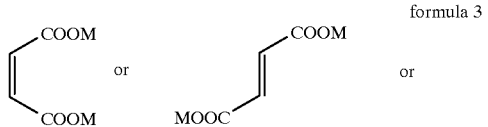

formula 3

-continued

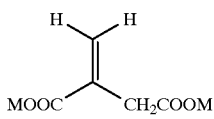

wherein M is selected from the group consisting of hydrogen or an alkali- or alkaline earth metal, ammonium or ammonium derived from primary, secondary or tertiary amines.

2. The cement dispersing agent of claim 1, whereby the watersoluble N-vinyl copolymer is obtainable by copolymerization of a N-vinyl amide or N-vinyl lactame 1, a second monomer 2, a third monomer 3 and a fourth monomer represented by the formula 4 formula 4

wherein M is selected from the group consisting of an alkali metal, alkaline earth metal, ammonium or ammonium derived from primary, secondary or tertiary amines, such that the molar ratio of constituent monomer units 1:2:3:4 is 1:(0.1–0.95):(0.05–0.90):(0.01–0.1).

3. The cement dispersing agent of claim 1, wherein the number-average molecular weight of said water-soluble N-vinyl copolymer is in the range of 3000–35000.

4. The cement dispersing agent of claim 1, wherein the first monomer represented by formula 1 is N-vinylpyrrolidinone.

5. The cement dispersing agent of claim 1, wherein the second monomer represented by formula 2 is the reaction product of maleic anhydride and a polyethyleneglycol-monomethyl ether with a molar number of additive ethylene oxide of from 7 to 115.

6. The cement dispersing agent of claim 1, wherein the third monomer represented by formula 3 is the sodium salt of the maleic acid.

7. The cement dispersing agent of claim 1, wherein the third monomer represented by formula 3 is the sodium salt of itaconic acid.

8. The cement dispersing agent of claim 1, wherein the copolymerization ratio of monomers 1:2:3:4 is 1:(0.2–0.6):(0.4–0.8):(0.01–0.05).

9. A mortar or concrete comprising a unit content of a binder and a dispersing agent according to claim 1 in an amount of 0.01%–10% by weight of the binder, said binder composed of cement or a mixture of cement and latent hydraulic or inert microscopic powder of 150 to 800 kg/m$^3$, and said mortar or concrete having a water-to-binder ratio in the range of 0.15–0.50.

10. A mortar or concrete according to claim 9, wherein the latent hydraulic or inert microscopic powder is 450 to 750 kg/m$^3$.

11. A mortar or concrete according to claim 9, wherein the water-to-binder ratio is in the range of 0.18 to 0.35.

12. A mortar or concrete according to claim 9, wherein the cement is selected from the group consisting of Portland cement, white cement or high alumina cement and wherein the latent hydraulic or inert microscopic powder is selected from the group consisting of fly ash, slag, silica fume, burnt oil shale, metakaolin or calcium carbonate.

* * * * *